United States Patent
Wells (10) Patent No.: US 7,389,538 B2
(45) Date of Patent: Jun. 17, 2008

(54) STATIC CODE IMAGE MODELING AND RECOGNITION

(75) Inventor: Joseph Wells, Pahrump, NV (US)

(73) Assignee: Fortinet, Inc., Sunnyvale, CA (US)

( * ) Notice: Subject to any disclaimer, the term of this patent is extended or adjusted under 35 U.S.C. 154(b) by 952 days.

(21) Appl. No.: 10/712,979

(22) Filed: Nov. 12, 2003

(65) Prior Publication Data

US 2005/0102601 A1     May 12, 2005

(51) Int. Cl.
*G06F 11/00* (2006.01)
*G06F 17/30* (2006.01)

(52) U.S. Cl. ............................ 726/22; 726/23; 726/24; 726/26

(58) Field of Classification Search ............ 726/22–24, 726/26; 713/187–188
See application file for complete search history.

(56) References Cited

U.S. PATENT DOCUMENTS 6,748,520 B1 *   6/2004   Maynard et al. ............ 712/220

* cited by examiner

*Primary Examiner*—Hosuk Song
(74) *Attorney, Agent, or Firm*—Bingham McCutchen LLP (57) ABSTRACT

A method for processing network traffic content includes receiving a content stream having an operation code and an operand, and building a new stream by either adding data to the operation code or removing the operand from the content stream. A method for processing network traffic content includes receiving a content stream, the content stream having an operation code and an operand, building a new stream by either adding data to the operation code or removing the operand from the content stream, creating a first model using at least a portion of the new stream, and searching a first cyclic redundancy check table to determine if the first model matches with a cyclic redundancy check element stored in the first cyclic redundancy check table.

37 Claims, 8 Drawing Sheets

Figure 9:
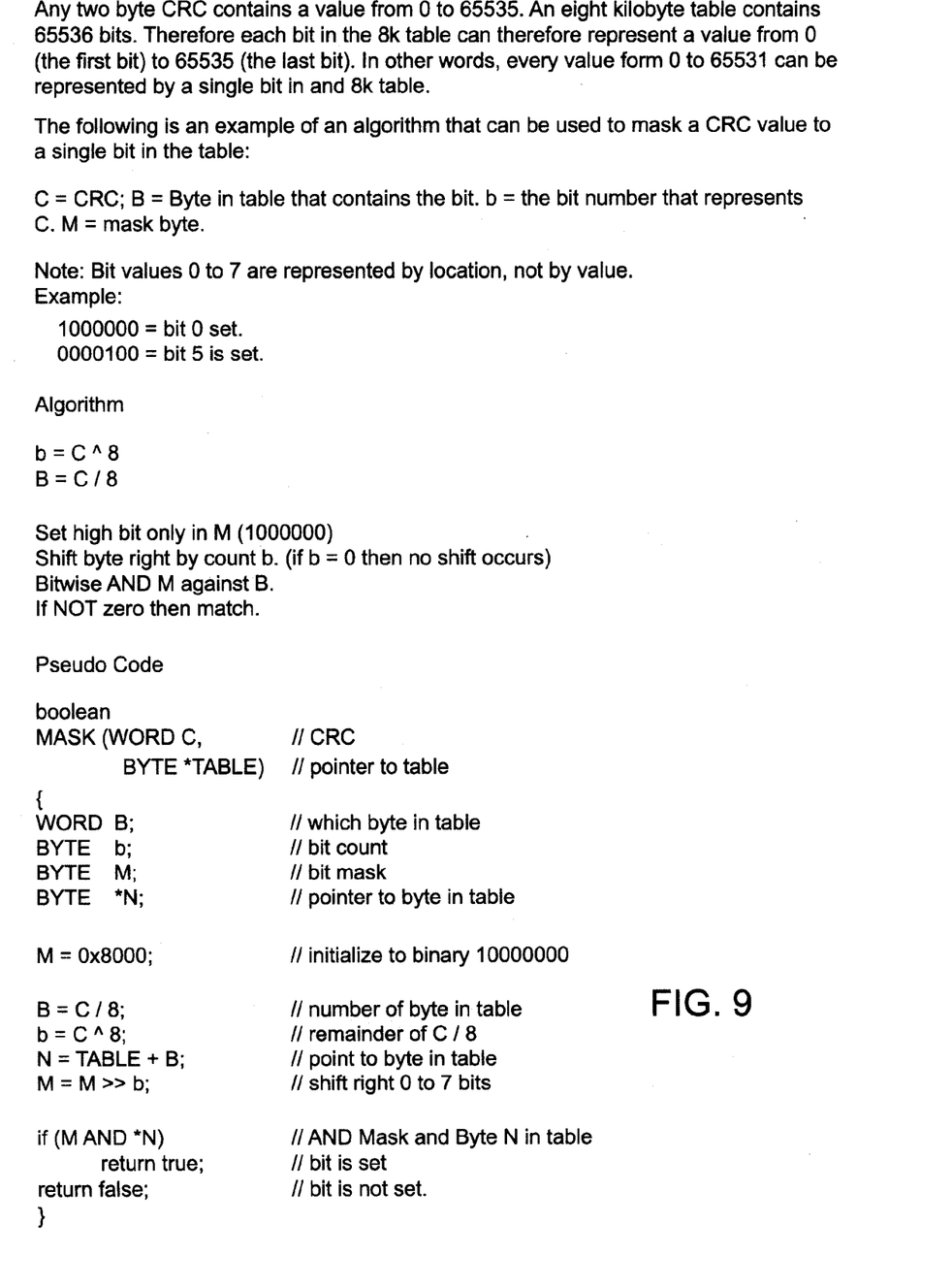
FIG. 9 is an example of a pesudocode, illustrating an algorithm that can be used to mask a CRC value to a bit in a table.

Any two byte CRC contains a value from 0 to 65535. An eight kilobyte table contains 65536 bits. Therefore each bit in the 8k table can therefore represent a value from 0 (the first bit) to 65535 (the last bit). In other words, every value form 0 to 65531 can be represented by a single bit in and 8k table.

The following is an example of an algorithm that can be used to mask a CRC value to a single bit in the table:

C = CRC; B = Byte in table that contains the bit. b = the bit number that represents C. M = mask byte.

Note: Bit values 0 to 7 are represented by location, not by value.
Example:
    1000000 = bit 0 set.
    0000100 = bit 5 is set.

Algorithm b = C ^ 8
B = C / 8

Set high bit only in M (1000000)
Shift byte right by count b. (if b = 0 then no shift occurs)
Bitwise AND M against B.
If NOT zero then match.

Pseudo Code

```
boolean
MASK (WORD C,            // CRC
      BYTE *TABLE)       // pointer to table
{
WORD  B;                 // which byte in table
BYTE  b;                 // bit count
BYTE  M;                 // bit mask
BYTE  *N;                // pointer to byte in table M = 0x8000;              // initialize to binary 10000000

B = C / 8;               // number of byte in table
b = C ^ 8;               // remainder of C / 8
N = TABLE + B;           // point to byte in table
M = M >> b;              // shift right 0 to 7 bits if (M AND *N)            // AND Mask and Byte N in table
      return true;       // bit is set
return false;            // bit is not set.
}
```

STATIC CODE IMAGE MODELING AND RECOGNITION

BACKGROUND OF THE INVENTION

1. Field of the Invention

The field of the invention relates to computer systems and computer networks, and more particularly, to systems and methods for detecting content of computer and network traffic.

2. Background of the Invention

The generation and spreading of computer viruses are major problems in computer systems and computer networks. A computer virus is a program that is capable of attaching to other programs or sets of computer instructions, replicating itself, and/or performing unsolicited or malicious actions on a computer system. Viruses may be embedded in email attachments, files downloaded from Internet, and macros in MS Office files. The damage that can be done by a computer virus may range from mild interference with a program, such as a display of unsolicited messages or graphics, to complete destruction of data on a user's hard drive or server.

To provide protection from viruses, most organizations have installed virus scanning software on computers in their network. However, these organizations may still be vulnerable to a virus attack until every host in their network has received updated anti-virus software. With new attacks reported almost weekly, organizations are constantly exposed to virus attacks, and spend significant resources ensuring that all hosts are constantly updated with new anti-virus information. In addition, anti-virus programs that operate at the application-level require enormous computing resources, making such anti-virus programs expensive to deploy and manage. For example, some existing anti-virus programs detect virus by extracting a signature using a fixed length of instruction stream, and then using the signature to detect virus. However, such method may require tremendous processing time, thereby preventing network content from being efficiently passed to an end user.

Accordingly, improved systems and methods for detecting content of computer and network traffic would be useful.

SUMMARY OF THE INVENTION

In accordance with some embodiments of the invention, a method for processing network traffic content includes receiving a content stream having an operation code and an operand, and building a new stream by either adding data to the operation code or removing the operand from the content stream.

In accordance with other embodiments of the invention, a method for processing network traffic content includes receiving a content stream, the content stream having an operation code and an operand, building a new stream by either adding data to the operation code or removing the operand from the content stream, creating a first model using at least a portion of the new stream, and searching a first cyclic redundancy check table to determine if the first model matches with a cyclic redundancy check element stored in the first cyclic redundancy check table.

In accordance with other embodiments of the invention, a method for processing network traffic content includes receiving a content stream, creating a first model using raw data of the content stream, and searching a first bit table to determine if the first model is represented by a bit set stored in the first bit table.

Other aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting its scope, the invention will be described and explained with additional specificity and detail through the use of the accompanying drawings.

DETAILED DESCRIPTION OF THE PREFERRED EMBODIMENTS

Various embodiments of the present invention are described hereinafter with reference to the figures. It should be noted that the figures are not drawn to scale and that elements of similar structures or functions are represented by like reference numerals throughout the figures. It should also be noted that the figures are only intended to facilitate the description of specific embodiments of the invention. They are not intended as an exhaustive description of the invention or as a limitation on the scope of the invention. In addition, an illustrated embodiment needs not have all the aspects or advantages of the invention shown. An aspect or an advantage described in conjunction with a particular embodiment of the present invention is not necessarily limited to that embodiment and can be practiced in any other embodiments of the present invention even if not so illustrated.

Figure 1:
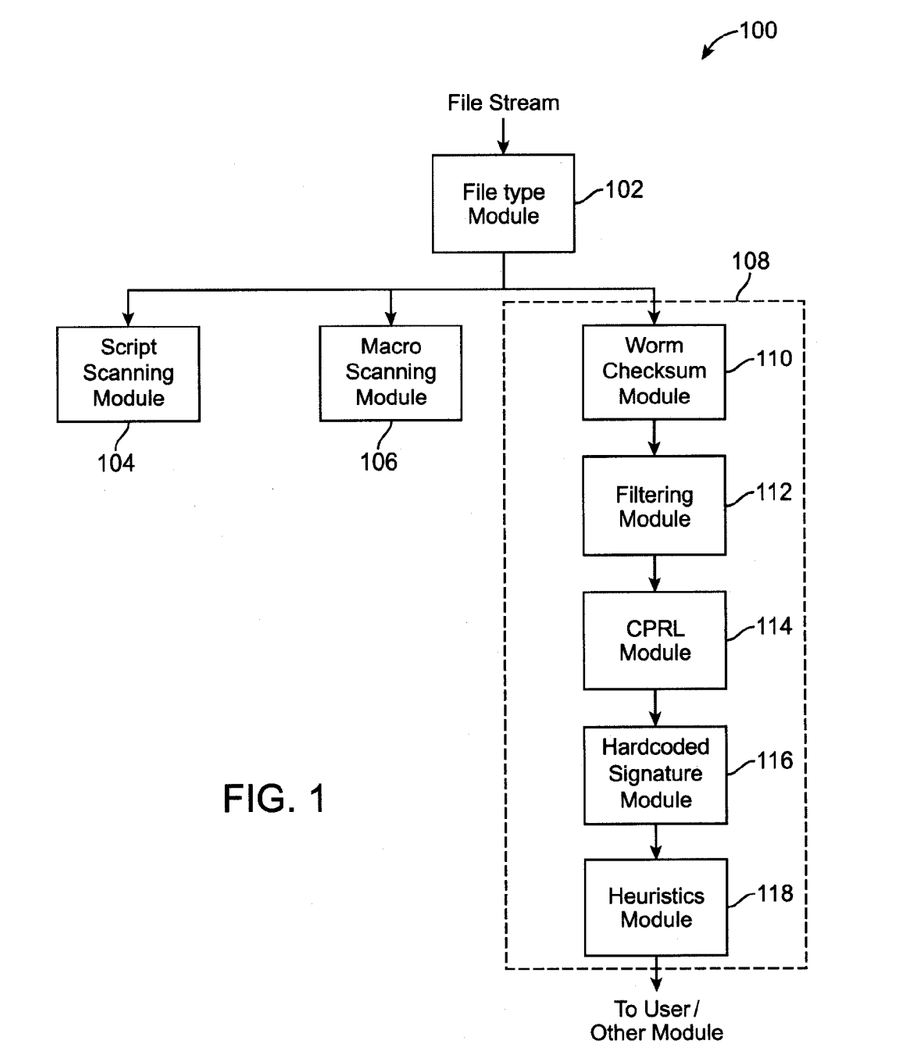
FIG. 1 illustrates a detection system having a filtering module in accordance with some embodiments of the invention.

FIG. 1 illustrates a detection system 100, which includes a filtering module 112 in accordance with embodiments of the present invention. Detection system 100 is configured to detect a program content, such as a virus, and/or a non-program content, such as a web content, being transmitted from Internet to users or to another module for processing network traffic content. Detection system 100 scans network traffic content transmitted from Internet and prevents undesirable content, such as a virus, a worm, an email spam, and a web page containing undesirable content, from being transmitted to users. Besides detecting content, detection system 100 may also modify or re-direct network traffic content such that, for examples, a virus may be removed from a network stream, or a HTTP request may be blocked. In some embodiments, at least a portion of detection system 100 may be implemented as a firewall, a component of a firewall, or a component that is configured to be coupled to a firewall.

Detection system 100 includes a file type module 102, a script scanning module 104, a macro scanning module 106, and a binary scanning module 108. File type module 102 is configured for determining an internal structure of a content stream and a type of content being examined. If the network content being examined is a script, the network content is then sent to script scanning module 104 for processing. If the network content being examined is a Microsoft office document or other similar types of content, the network content is then sent to macro scanning module 106 for processing. If the network content is a binary file, it is passed to binary scanning module 108 for processing. In alternative embodiments, script scanning module 104 and macro scanning module 106 can be implemented as components that are not parts of detection system 100. In such cases, detection system 100 does not include script scanning module 104 and macro scanning module 106. Devices for processing script and macro files that can be used to implement script scanning module 104 and macro scanning module 106 are known in the art, and therefore, will not be discussed in further detail.

Binary scanning module 108 includes a worm checksum module 110, a filtering module 112, a content pattern recognition language (CPRL) module 114, a hard coded signature module 116, and a heuristics module 118. Worm checksum module 110 is configured to examine the network content to determine if the network content is a known static worm. In one embodiment, a content or file size is used as a trigger to determine if the network content needs to be checksummed. If the network content is checksummed, then the network content is searched against known worm checksums and may bypass the remaining scanning modules 112, 114, 116, and 118 if a match is found. In alternative embodiments, binary scanning module 108 does not include worm checksum module 110, and worm checksum module 110 can be implemented in system 100 as a separate component that is not a part of binary scanning module 108. In other embodiments, worm checksum module 110 can also be implemented as a separate component that is not a part of system 100. In such cases, system 100 does not include worm checksum module 110.

Filtering module 112 examines the byte streams of the network traffic quickly and determines whether the network traffic contains or may contain a content desired to be detected. Particularly, filtering module 112 is configured to create multiple models of a network content, and pass the created models through various detecting schemes of increasing levels of accuracy in order to efficiently screen and/or detect network content, such as a virus or a potential virus. In some embodiments, filtering module 112 assists a detection of a network content by operating with another content detection device or processor. In other embodiments, filtering module 112 is used as a primary processing module to detect network content. In the illustrated embodiments, filtering module 112 is configured to operate with CPRL module 114, hard coded signature module 116, and heuristics module 118. If no matches are found by filtering module 112, the network content or file stream is then passed to CPRL module 114, hard coded signature module 116, and heuristics module 118.

CPRL module 114 applies CPRL signatures to the network content to determine if any of the CPRL signatures matches with the network content. Like predicate logic, a signature codified using CPRL is treated as a formula made up of logical elements and is rule-based. Unlike traditional virus signatures, which are used to detect virus using byte-by-byte comparison, a signature created using CPRL represents one or more instructions that control an operation of a processor being used to detect content. For examples, a signature created using CPRL may provide instructions for calling functions, pointing to a different signature, calling an interpreter of the signature recursively, responding to a returned information, and/or performing other functions. As such, CPRL is a true pattern recognition language, and is far more powerful then traditional antivirus signatures. CPRL language, and systems and methods of using CPRL language, have been described in U.S. patent application Ser. Nos. 10/624,914; 10/624,452, 10/624,941; 10/624,948 all filed on Jul. 21, 2003, the disclosures of which are expressly incorporated by reference herein. In alternative embodiments, instead of using CPRL module 114, binary scanning module 108 can include other types of detection devices or content processors to process network content that has been passed from filtering module 112. Also in alternative embodiments, CPRL module 114 is not required, and detection system 100 does not include CPRL module 114.

If no virus is detected by CPRL module 114, the network content is then passed to hard coded signature module 116 for processing. Hard coded signature module 116 contains algorithmic routines for detecting some polymorphic viruses or other types of viruses that may be difficult to detect. For example, algorithmic routines, such as those known in the art, can be used to detect specific code objects or patterns in a host file. In alternative embodiments, instead of using hard coded signature module 116, binary scanning module 108 can include other types of detection devices or content processors to perform the same or similar functions. Also in alternative embodiments, hard coded signature module 116 is not required, and detection system 100 does not include hard coded signature module 116.

Finally, the network content and a number of heuristic flags that were enabled by filtering module 112 and CPRL module 114 are passed to heuristic module 118. Heuristic module 118 can be optionally enabled by a user to detect new virus or new variants of a virus based on the heuristic flags. If no match is found by heuristic module 118, the network content is then passed to a user, or alternatively, to another processing module for further processing of the network content. In alternative embodiments, instead of using heuristic module 118, binary scanning module 108 can include other types of detection devices or content processors to perform the same or similar functions. Also in alternative embodiments, heuristic module 118 is not required, and detection system 100 does not include heuristic module 118.

Although filtering module 112 is illustrated as a separate component in binary scanning module 108, in alternative embodiments, filtering module 112 can be integrated with any of the components of binary scanning module 108. For example, in some embodiments, filtering module 112 can be a part of a detection device that includes both filtering module 112 and CPRL module 114.

Figure 2:
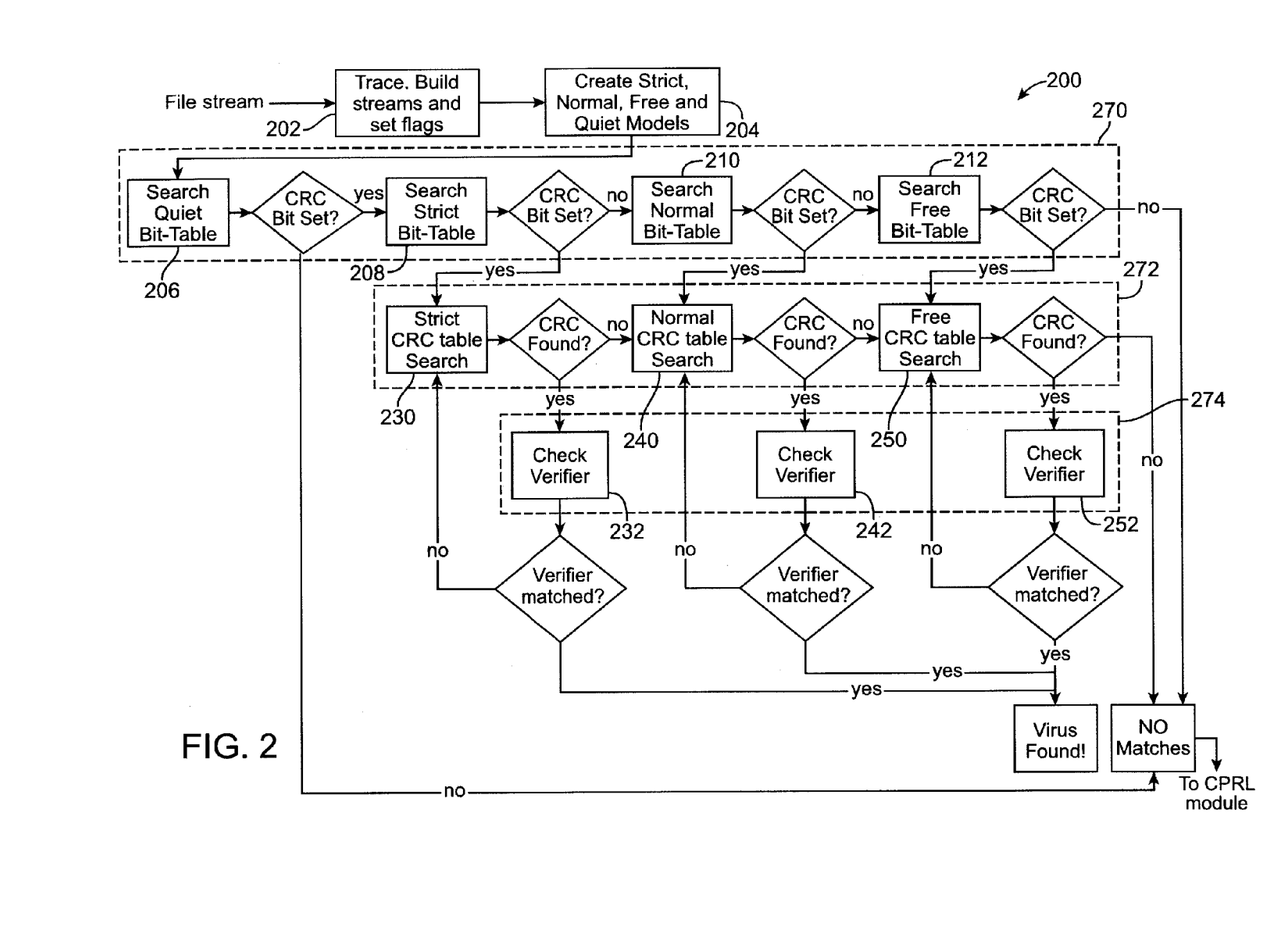
FIG. 2 is a flow chart showing a process for processing content of network traffic in accordance with some embodiments of the invention.

FIG. 2 is a flow chart illustrating a process 200 that is performed by filtering module 112 in accordance with some embodiments of the invention. Initially, filtering module 112 traces the byte stream of the network content and builds several trace streams of instructions (step 202).

Figure 3:
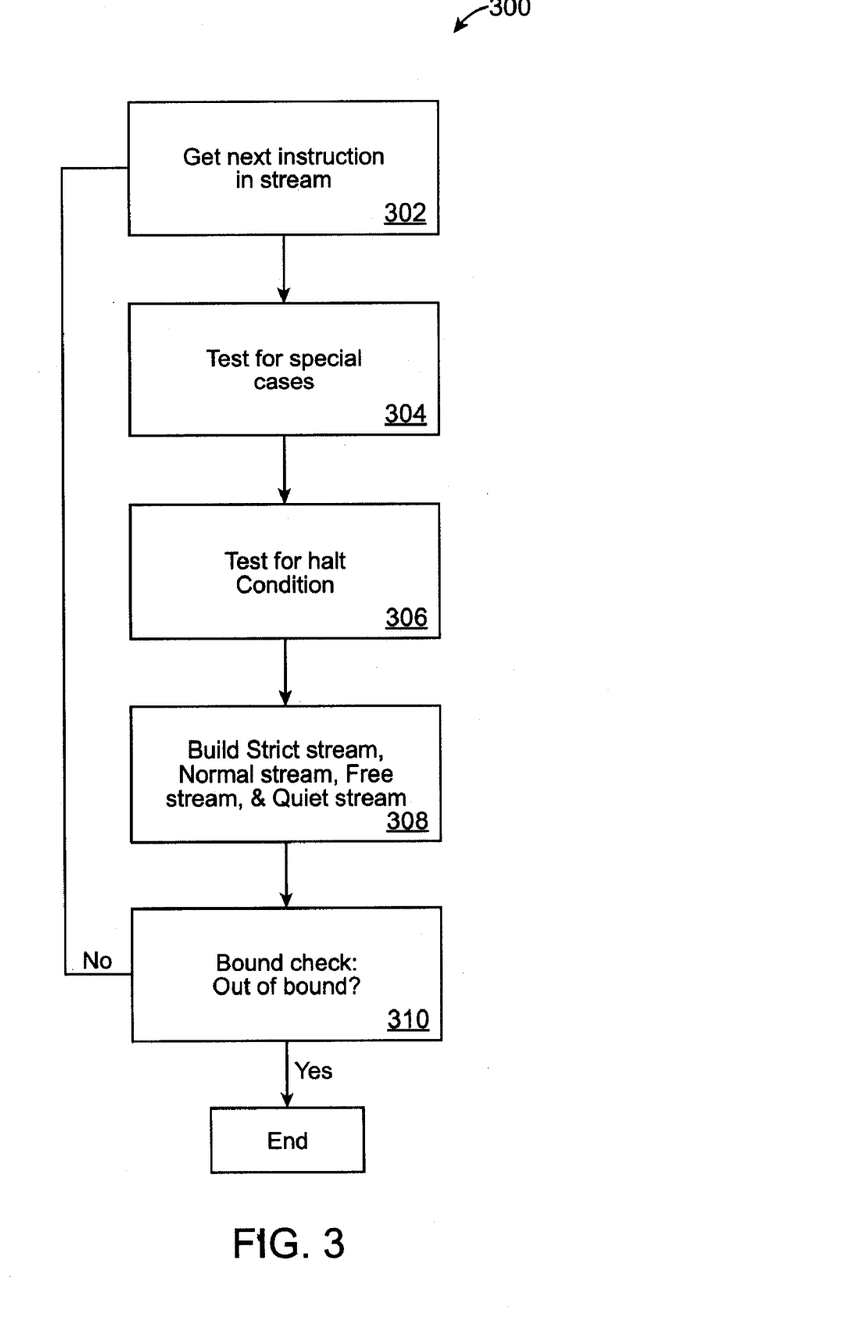
FIG. 3 is a flow chart showing a process of building stream models in accordance with some embodiments of the invention.

FIG. 3 is a flow chart illustrating a process 300 of building trace streams. First, filtering module 112 receives a next instruction, e.g., an instruction that is 1-12 bytes, of the network traffic content stream (step 302). In one embodiment, filtering module 112 includes, or has access to, a table that contains all byte streams that can be detected. Filtering module 112 looks up the table to determine a length of instruction to be received and processed by filtering module 112. Filtering module 112 also determines which components are needed for subsequent processing. For example, if the instruction contains a MOD-REG-R/M byte, then filtering module 112 takes the associated operation code and the MOD-REG-R/M byte for subsequent processing. On the other hand, if the instruction contains a SIB byte, then filtering module 112 takes the associated operation code, the MOD-REG-R/M byte, and the SIB byte for subsequent processing. Filtering module 112 can also perform other operations based on the instruction of the byte stream received and other preset conditions.

Next, filtering module 112 determines if the instruction of the network content is of a type that requires special handling (step 304). For examples, instruction associated with branching, looping, or other types of operation that involve a shift in a pointer, may require a different or an additional procedure to keep track of a pointer's position. Filtering module 112 also determines if a halt condition exists (step 306). For examples, if an undesirable instruction is encountered, or if the end of a network stream has been reached, filtering module 112 may stop tracing the network content stream. In alternative embodiments, the testing for special handling and halt condition may be performed by another module that is separate from filtering module 112. In such cases, process 200 may not include steps 304 and 306.

Next, filtering module 112 builds a strict stream (S-stream), a normal stream (N-stream), a free stream (F-stream), and a quiet stream (Q-stream) using raw data from the byte stream instruction of the network content (step 308). The S-stream contains assembly instruction (operation code) and data information (operands) used by the operation code, as they appear in the file stream. In one embodiment, the S-stream is created by taking a raw signature of the operation code and/or operands, and converting it into a double link list. For example, if the byte stream contains a 3 bytes instruction, filtering module 112 builds a S-stream by adding a value (i.e., "3") representative of a length of the instruction before and after the instruction data. Because the S-stream contains more information that the original byte stream, the S-stream is stronger than the original byte stream of the network content.

The N-stream is created by extracting a static code in the byte stream, and therefore, does not contain operands. Because the N-stream does not contain operands, the N-stream is weaker than the original byte stream of the network content, which may include both static code and operands. In some embodiments, the N-stream includes operation codes of the instruction. Alternatively, the N-stream can include operation codes and their corresponding MOD-REG-R/M (i.e., mode, registry, and registry/memory) bytes and SIB bytes.

The F-stream is created by sorting (e.g., performing a numeric sort) the operation codes of the N-stream. Because the F-stream also does not contain operands, and the order of the operation codes are lost by the sorting, the F-stream is weaker than the original byte stream of the network content. In some embodiments, the F-stream can be used to handle swapping bytes and swapping codes in a byte stream.

The Q-stream is created by removing all noise operation codes, such as noise bytes that are used by virus, from the N-stream, and sorting (e.g., performing a numeric sort) the operation codes of the remaining N-stream. Because the Q-stream does not contain operands and noise bytes, and the order of the operation codes are lost by the sorting, the Q-stream is weaker than the original byte stream of network content. In some embodiments, the Q-stream is designed to handle polymorphic virus.

After the four trace streams have been built for the received stream of instruction, filtering module 112 determines if the tracing is still within a prescribed bound (step 310). If the tracing is still within a prescribed bound, filtering module 112 gets the next instruction from the byte stream of network content (step 302), and the above described steps (steps 304, 306, 308, and 310) are repeated until the tracing exceeds a prescribed threshold. If the tracing is out of a buffer or exceeds a prescribed threshold, the trace stream building process ends. Although several examples of trace streams have been described, the scope of the invention should not be so limited. In alternative embodiments, filtering module 112 can be configured to create more than four trace streams, or less than four trace streams. Also, in alternative embodiments, filtering module 112 can create trace streams that are different from those described previously.

Returning to FIG. 2, after the trace streams have been built, filtering module 112 then builds mathematical models by performing cyclic redundancy checks (CRCs) for various lengths of instructions over each trace stream (step 204). In the illustrated embodiments, 16 bit cyclic redundancy checks are calculated for five lengths of instructions over each of the trace streams (i.e., S-stream, N-stream, F-stream, and Q-stream) in order to create respective models (i.e., S-model, N-model, F-model, and Q-model). For example, cyclic redundancy checks can be performed on the first 12 bytes, first 18 bytes, first 24 bytes, first 30 bytes, and first 36 bytes of each of the trace streams. As such, following the example, there will be a total of twenty 16-bit cyclic redundancy checks, five for each of the S-model, the N-model, the F-model, and the Q-model. A model created by performing CRC (CRC model") on a 36 bytes instruction may not be able to detect a virus that contains malgorithms after, for example, 34 bytes. As such, performing CRC on a plurality lengths of instruction is advantageous in that, a model created by performing CRC on a relatively shorter length of instruction (i.e., a "shorter" CRC model) may be used to detect a virus otherwise not detectable by a "longer" CRC model. In alternative embodiments, instead of five lengths of instructions, filtering module 112 can perform cyclic redundancy checks for different number of lengths of instructions over some or all of the trace streams. Also, in alternative embodiments, the length of instructions can be different from the examples discussed previously. Furthermore, in alternative embodiments, instead of performing CRC to create models, filtering module 112 can be configured to perform other process or mathematical procedure to create the models.

Figure 4:
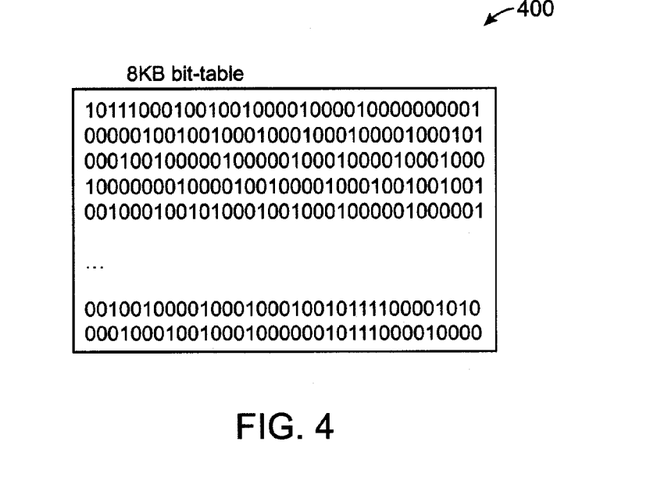
FIG. 4 shows an example of a bit-table.

After the CRC models have been built, the CRC models are passed to one or more processing modules, which performs preliminary scanning of the network content (steps 206, 208, 210, 212). In the illustrated embodiments, filtering module 112 includes, or has access to, four bit tables, i.e., a Strict bit table, a Normal bit table, a Free bit table, and a Quiet bit table, each of which containing 65,535 bits (8 KB) and associating with the a respective CRC model (i.e., S-model, N-model, F-model, and Q-model, respectively). FIG. 4 shows an example of a bit table, which contains a series of "0"s and "1"s. Each bit that is enabled in the table represents one or more viruses that may be detected by filtering module 112. For example, in the illustrated example, "1" represents a virus detection that is available for a CRC model, and "0" represents no virus detection that is available for the CRC model. Each bit table is built from a 16-bit CRC of the smallest stream length (e.g., 12 bytes) that is associated with a content desired to be detected.

In one embodiment, each bit in the bit table matches a value from 0-65535, and a CRC model comprises 2 bytes, with each byte containing a value from 0-255. Therefore, the 2 bytes of the CRC model together represent a value from 0-65535 that can be matched in the bit table. Masking can be performed to test a specific bit in a specific byte in the 8 k table. In such case, the mask is a bitmask byte that logically corresponds with a target byte in the table. If the bit is set, a TRUE value is returned, thereby indicating a match. FIG. 9 shows an example of a pesudocode that can be used to mask a CRC value to a bit in the table.

Initially, the Q-model of the shortest length (e.g., 12 bytes) is used as a lookup in the Quiet bit table to determine if there is a match (step 206). In one embodiment, the following calculation may be performed to find a specific bit in the Quiet bit table: (1) Byteidx=crc>>3; //divide the crc by 8 to find the proper byte in the bit table, (2) Bitkey=crc % 8; bitmask=0x80>>Bitkey; //create a mask to select the specific bit, and (3) if ((Model_quiet[byteidx] & bitmask) !=0) then got a hit, else no matches. Since the Q-model of the shortest length is the "weakest" model (i.e., a model that most easily detects a content and/or most likely to give a false positive result), if no match is found, the network content is passed from filtering module 112 to CPRL module 114 or another processing module where a more vigorous detection scheme may be performed to detect content of the network traffic.

If a bit set in the Quiet bit table is found, then the S-model of the shortest length (e.g., 12 bytes) is used as a lookup in the Strict bit table to determine if there is a match (step 208). If no bit set is found in the Strict bit table that matches with the S-model, then the N-model of the shortest length (e.g., 12 bytes) is used as a lookup in the Normal bit table to determine if there is a match (step 210). If no bit set is found in the Normal bit table that matches with the N-model, then the F-model of the shortest length (e.g., 12 bytes) is used as a lookup in the Free bit table to determine if there is a match (step 212). If no bit set is found in the Free bit table that matches with the F-model, then the network content is passed to CPRL module 114 or another processing module for further processing of the network content. Alternatively, filtering module 112 can cause a message to be sent to a user, informing a user that only a match is found in the Quiet bit table.

Although the CRC models associated with the shortest instruction length are used as lookup in their respective bit tables, alternatively or additionally, the CRC models associated with other lengths of instruction can also be used as lookup in their respective bit tables. In addition, the order in which the bit tables are accessed should not be limited to the example discussed previously. In alternative embodiments, filtering module 112 can access the bit tables in other orders.

Figure 5:
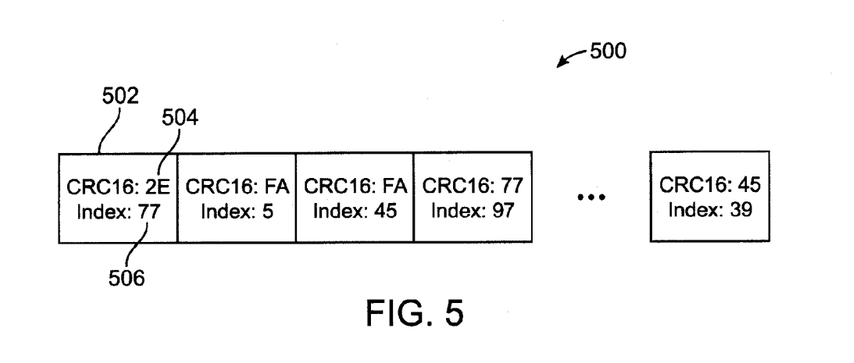
FIG. 5 shows an example of a cyclic redundancy check table.

If a bit set is found in one of the Strict, Normal, and Free bit tables, a corresponding CRC table is searched for one or more CRC elements that matches the value of the respective CRC model (step 230, 240, or 250). For example, if a match in the Strict bit table is found, filtering module 112 then searches the Strict CRC table for one or more CRC element that matches the CRC S-model. FIG. 5 shows an example of a CRC table 500, which includes one or more CRC elements 502. Each CRC element 502 includes a CRC value 504 and a verifier index 506. When performing a search using the Strict CRC table, for example, filtering module 112 compares the Strict CRC model with CRC value(s) 504 in the Strict CRC table. If no match is found in the Strict CRC table, filtering module 112 then performs similar search in the Normal CRC table (step 240). If no match is found in the Normal CRC table, filtering module 112 then performs similar search in the Free CRC table (step 250). If no match is found in the Free CRC table, the network content is then passed to CPRL module 114 or another processing module for further processing. In the illustrated embodiments, the CRC models associated with the shortest instruction length are used as lookup in their respective CRC tables. Alternatively or additionally, the CRC models associated with other lengths of instruction can also be used as lookup in their respective CRC tables.

Figure 6:
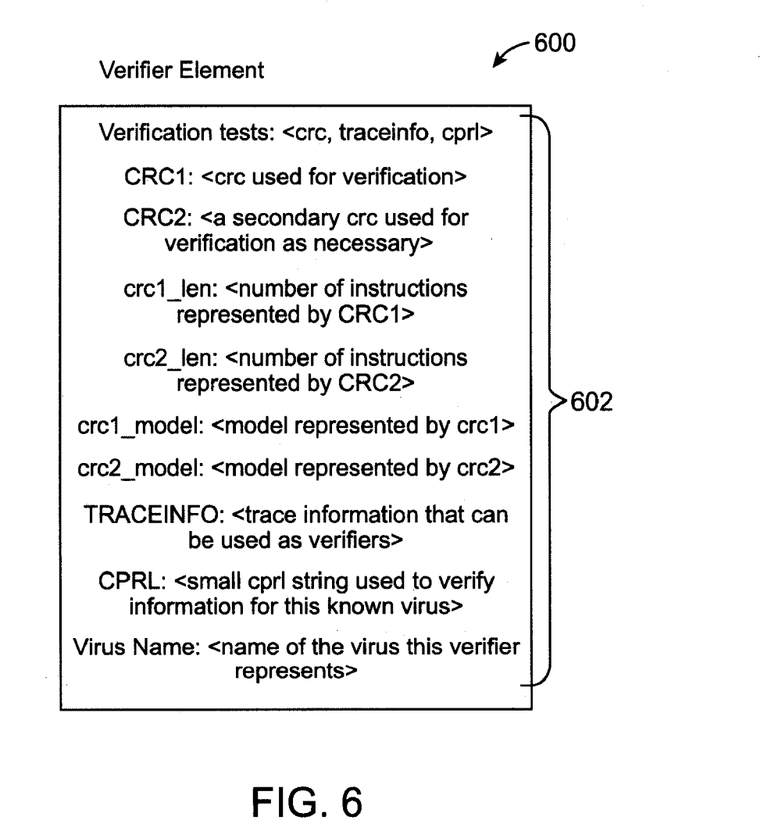
FIG. 6 shows an example of a verifier element.

For each CRC value that is found in the Strict, Normal, and Free CRC tables, filtering module 112 next performs verification to determine whether a virus has been detected (step 232, 242, 252). In the illustrated embodiment, filtering module 112 includes, or has access to, verifier tables that are associated with the Strict, Normal, and Free CRC tables. Each of the verifier tables includes one or more verifier elements, each of which is associated with verifier index 506 of CRC element 502. FIG. 6 shows an example of a verifier element 600, which includes a number of verifiers 602. A verifier 602 can be a variety of parameters, such as a number of bytes, total operation codes traced, total MOD-REG-R/M bytes encountered, total SIB bytes encountered, total noise bytes encountered, number of jumps or call instructions encountered, size of a file, size of a virus code from entry point to end of file, CRC of an entire file, or other parameters that can be used to help identify a content desired to be detected. If a CRC element 502 from a CRC table matches with a CRC model, filtering module 112 then uses corresponding verifier index 506 of CRC element 502 to look up a corresponding verifier element in the verifier table, and compares one or more parameters obtained during a processing of the network content with the verifier(s) of the verifier element to determine whether there is a match. For example, if the verifier element for a particular CRC element includes the following verifiers: total operation codes=36, and file size=20098 bytes, filtering module 112 then compares theses values with the number of operation codes and the file size that are obtained during a processing of the network content to determine if the network content is associated with a content desired to be detected.

If the parameter(s) associated with a CRC model matches the verifiers of a verifier element, then a content desired to be detected, such as a virus, may be considered to be found. In such case, filtering module 112 prevents the corresponding network content to be transmitted to a user, and/or causes a message to be sent to a user informing that a content desired to be detected has been identified. If none of the parameters matches a verifier, the corresponding network content is then transmitted to CPRL module 114 or another processing module for further processing of the network content. In alternative embodiments, filtering module 112 does not perform verification, and steps 232, 242, and 252 are not required. In such cases, if a match is found in one of the Strict, Normal, and Free CRC tables, detection system 100 prevents the corresponding network content to be transmitted to a user and/or sends a message to a user informing that a virus or a potential virus has been detected.

As illustrated in the above described embodiments, creating models having different relative strengths is advantageous in that filtering module 112 can use the weakest model (e.g., the Q-model) to quickly screen out content that cannot be detected by filtering module 112, while using the relatively stronger models (e.g., the S-model, N-model, and the F-model) to efficiently determine whether a network content is associated with a content desired to be detected. Also, passing models of the network content through filters (e.g., filters 270, 272, and 274) that perform different types or levels of search is also advantageous in that the weakest filter (e.g., filter 270) can be used to detect and/or pass network content quickly, while the stronger filters (e.g., filters 272 and 274) can be used to efficiently detect a network content and verify a detected network content.

Figure 7:
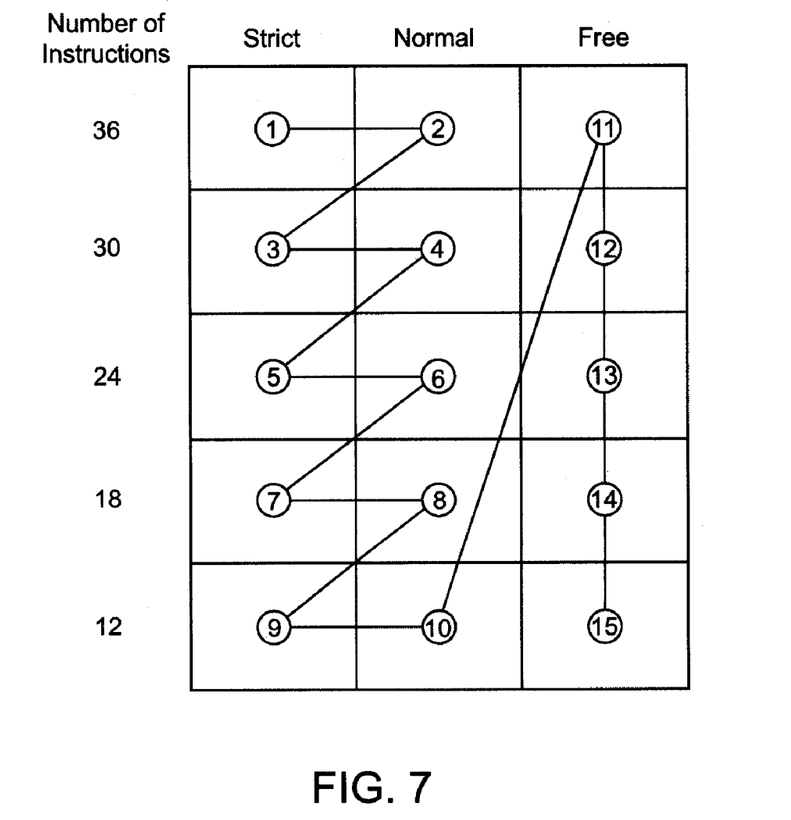
FIG. 7 shows an order of priority in which cyclic redundancy check elements are selected for validation in accordance with some embodiments of the invention.

In some embodiments, the various databases (e.g., the bit tables, the CRC tables, and the verifier tables) accessible by filtering module 112 can be created and inputted by a user or a system administrator. In other embodiments, filtering module 112 is configured to build its own database(s). For example, a sample of a content desired to be detected can be inputted to filtering module 112. Filtering module 112 then traces the execution path of the sample, generates CRC models, and calculates checksums for each of the models and for each instruction stream length, as similarly discussed previously. The results of modeling, together with other flags and/or information generated during the processing of the sample, are then transmitted to a post processing module, which will attempt to choose the strongest CRC element or set of CRC elements from existing databases for detection and validation. In some embodiments, CRC elements are chosen in the order of priority shown in FIG. 7. Because detecting a content using a Strict CRC model with the longest stream of instruction (e.g., 36 bytes) is the least likely to result in a false detection, the Strict CRC element should be chosen first if it is available. If a Strict CRC element associated with the longest stream instruction is not available, then the Normal CRC element associated with the longest stream instruction should be chosen, as illustrated in the figure. In alternative embodiments, CRC elements can be chosen in other orders other than that shown in FIG. 7. Based on the chosen CRC element(s), the post processing module outputs a signature having information that can be added to various databases. For examples, the signature can include a virus name, a model type (e.g., Strict, Normal, Free, Quiet), number of CRCs used for verification, number of operation codes represented by CRC model, verification method (e.g., CPRL, CRC, flag tracing), and type(s) of flag being traced.

Those skilled in the art understands that any or all of the functions performed by detection system 100 can be implemented using software, hardware, or combination thereof. In some embodiments, filtering module 112 is implemented as a hardware that is a component of a firewall. For example, filtering module 116 can be implemented using a processor, such as an application-specific integrated circuit (ASIC), or a general processor. ASIC processors that can be used include semi-custom ASIC processors or a programmable ASIC processors. ASICs, such as those described in Application-Specific Integrated Circuits by Michael J. S. Smith, Addison-Wesley Pub Co. (1st Edition, June 1997), are well known in the art of circuit design, and therefore will not be described in further detail herein.

Figure 8:
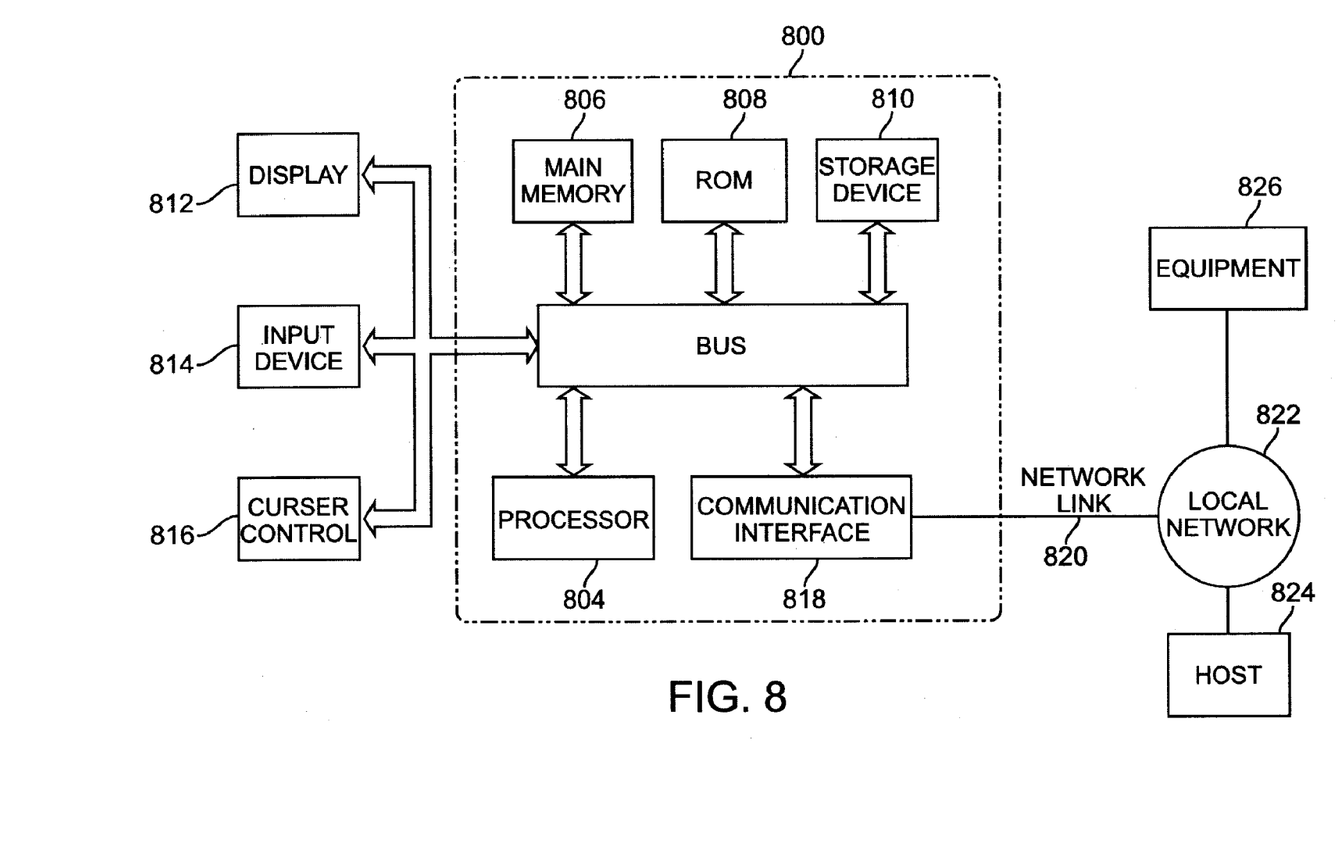
FIG. 8 is a diagram of a computer hardware system with which embodiments of the present invention can be implemented.

Alternatively, a computer system may also be used to implement filtering module 112 to perform the same or similar functions described herein. FIG. 8 is a block diagram that illustrates an embodiment of a computer system 800 upon which embodiments of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 may further include a read only memory (ROM) 808 or other static storage device coupled to bus 802 for storing static information and instructions for processor 804. A data storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for processing network traffic content. According to some embodiments of the invention, such use may be provided by computer system 800 in response to processor 804 executing one or more sequences of one or more instructions contained in the main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry data streams representing various types of information.

Network link 820 typically provides data communication through one or more networks to other devices. For example, network link 820 may provide a connection through local network 822 to a host computer 824, or to an equipment 826. The data streams transported over the network link 820 can comprise electrical, electromagnetic or optical signals. The signals through the various networks and the signals on network link 820 and through communication interface 818, which carry data to and from computer system 800, are exemplary forms of carrier waves transporting the information. Computer system 800 can send messages and receive data, including program code, through the network(s), network link 820, and communication interface 818. Although one network link 820 is shown, in alternative embodiments, communication interface 818 can provide coupling to a plurality of network links, each of which connected to one or more local networks. In some embodiments, computer system 800 may receive data from one network, and transmit the data to another network. Computer system 800 may process and/or modify the data before transmitting it to another network.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method for processing network traffic content, the method comprising:
   receiving a content stream having an operation code and an operand;
   building a new stream by either adding data to the operation code or removing the operand from the content stream, wherein the building the new stream comprises removing the operand from the content stream, and removing a noise operation code from the content stream; and
   storing the new stream in a computer readable medium;
   wherein the content stream comprises one or more additional operation code, and the method further comprising sorting the operation codes of the content stream after the noise operation code is removed.

2. A method for processing network traffic content, the method comprising:
   receiving a content stream having an operation code and an operand;
   building a new stream by either adding data to the operation code or removing the operand from the content stream;
   storing the new stream in a computer readable medium; and
   creating a model using at least a portion of the new stream, wherein the creating comprises performing a cyclic redundancy check on at least a portion of the new stream, and wherein the at least a portion of the new stream comprises a first 12 bytes, a first 18 bytes, a first 24 bytes, a first 30 bytes, or a first 36 bytes, of the new stream.

3. The method of claim 2, wherein the building the new stream comprises adding data to the operation code.

4. The method of claim 3, wherein the data comprises one or more values representative of a length of an instruction.

5. The method of claim 3, wherein the adding data to the operation code comprises adding a first variable before an instruction data of the content stream and a second variable after an instruction data of the content stream.

6. The method of claim 2, wherein the building the new stream comprises removing the operand from the content stream.

7. The method of claim 6, wherein the content stream comprises one or more additional operation code, and the method further comprising sorting the operation codes after the operand is removed.

8. The method of claim 6, wherein the building the new stream further comprises removing a noise operation code from the content stream.

9. The method of claim 2, wherein the model is selected from the group consisting of a Strict model, a Normal model, a Free model, and a Quiet model.

10. A method for processing network traffic content, the method comprising:
    receiving a content stream having an operation code and an operand;
    building a new stream by either adding data to the operation code or removing the operand from the content stream;
    storing the new stream in a computer readable medium; and
    creating a model using at least a portion of the new stream;
    providing a bit table for the model;

searching the bit table to determine if the model is represented by a bit set in the bit table;

providing a cyclic redundancy check table for the model, the cyclic redundancy check table having a plurality of cyclic redundancy check elements; and searching the cyclic redundancy check table to determine if the model matches with one of the plurality of cyclic redundancy check elements in the cyclic redundancy check table.

11. The method of claim 10, further comprising verifying a detection of a content when the model matches with a cyclic redundancy check element in the cyclic redundancy check table.

12. The method of claim 11, wherein the verifying comprises comparing a parameter obtained during a processing of the content stream with a verifier of a cyclic redundancy check element.

13. A system for processing network traffic content, the system comprising:

means for receiving a content stream having an operation code and an operand;

means for building a new stream by either adding data to the operation code or removing the operand from the content stream;

means for creating a model using at least a portion of the new stream;

means for providing a bit table for the model;

means for searching the bit table to determine if the model is represented by a bit set in the bit table; and means for providing a cyclic redundancy check table for the model, the cyclic redundancy check table having a plurality of cyclic redundancy check elements; and means for searching the cyclic redundancy check table to determine if the model matches with one of the plurality of cyclic redundancy check elements in the cyclic redundancy check table, wherein the means for searching the cyclic redundancy check table comprises a processor.

14. The system of claim 13, wherein the model is selected from the group consisting of a Strict model, a Normal model, a Free model, and a Quiet model.

15. The system of claim 13, wherein the means for creating performs a cyclic redundancy check on at least a portion of the new stream.

16. The system of claim 13, further comprising means for verifying a detection of a content when the model matches with a cyclic redundancy check element in the cyclic redundancy check table.

17. The system of claim 16, wherein the means for verifying compares a parameter obtained during a processing of the content stream with a verifier of a cyclic redundancy check element.

18. A system for processing network traffic content, the system comprising:

means for receiving a content stream having an operation code and an operand;

means for building a new stream by either adding data to the operation code or removing the operand from the content stream; and means for creating a model using at least a portion of the new stream, wherein the means for creating performs a cyclic redundancy check on at least a portion of the new stream, wherein the means for creating a model comprises a processor, and wherein the at least a portion of the new stream comprises a first 12 bytes, a first 18 bytes, a first 24 bytes, a first 30 bytes, or a first 36 bytes, of the new stream.

19. A method for processing network traffic content, the method comprising:

receiving a content stream, the content stream having an operation code and an operand;

building a new stream by either adding data to the operation code or removing the operand from the content stream;

creating a first model using at least a portion of the new stream;

storing the first model in a computer readable medium; and searching a first cyclic redundancy check table to determine if the first model matches with a cyclic redundancy check element stored in the first cyclic redundancy check table.

20. The method of claim 19, wherein the building the new stream comprises adding data to the operation code.

21. The method of claim 20, wherein the adding data to the operation code comprises adding a first variable before an instruction data of the content stream and a second variable after an instruction data of the content stream.

22. The method of claim 19, further comprising:

creating a second model using raw data of the content stream; and searching a second cyclic redundancy check table to determine if the second model matches with a cyclic redundancy check element stored in the second cyclic redundancy check table.

23. The method of claim 22, wherein the creating the second model comprises removing the operand from the content stream.

24. The method of claim 22, further comprising:

creating a third model using raw data of the content stream; and searching a third cyclic redundancy check table to determine if the third model matches with a cyclic redundancy check element stored in the third cyclic redundancy check table.

25. The method of claim 24, wherein the content stream comprises one or more additional operation codes, and wherein the creating the third model comprises:

removing the operand from the content stream; and sorting the operation codes of the content stream after the removing.

26. The method of claim 19, further comprising:

creating a quiet model using raw data of the content stream; and searching a quiet bit table to determine if the quiet model is represented by a bit set stored in the quiet bit table, wherein the searching the quiet bit table is performed before the searching the first cyclic redundancy check table.

27. The method of claim 26, further comprising:

creating a strict model using raw data of the content stream; and searching a strict bit table to determine if the strict model is represented by a bit set stored in the strict bit table.

28. The method of claim 27, further comprising:

creating a normal model using raw data of the content stream; and searching a normal bit table to determine if the normal model is represented by a bit set stored in the normal bit table.

29. The method of claim 28, further comprising:
creating a free model using raw data of the content stream; and
searching a free bit table to determine if the free model is represented by a bit set stored in the free bit table.

30. A system for processing network traffic content, the system comprising:
means for receiving a content stream, the content stream having an operation code and an operand;
means for creating a new stream by either adding data to the operation code or removing the operand from the content stream;
means for creating a model using at least a portion of the new stream; and
means for searching a cyclic redundancy check table to determine if the model matches with a cyclic redundancy check element stored in the cyclic redundancy check table,
wherein the means for searching a cyclic redundancy check table comprises a processor.

31. A product that includes a tangible readable medium usable by a processor and has a set of stored instructions, the execution of which causes the processor to execute a process for processing network traffic content, the process comprising:
receiving a content stream, the content stream having an operation code and an operand;
creating a new stream by either adding data to the operation code or removing the operand from the content stream;
creating a model using at least a portion of the new stream;
storing the first model in a computer readable medium; and
searching a cyclic redundancy check table to determine if the model matches with a cyclic redundancy check element, wherein the cyclic redundancy check element is stored in the cyclic redundancy check table in a tangible volatile or non-volatile medium.

32. A method for processing network traffic content, the method comprising:
receiving a content stream;
creating a first model using raw data of the content stream;
storing the first model in a computer readable medium;
searching a first bit table to determine if the first model is represented by a bit set stored in the first bit table;
creating a second model using raw data of the content stream;
searching a second bit table to determine if the second model is represented by a bit set stored in the second bit table; and
searching a cyclic redundancy check table to determine if the second model matches with a cyclic redundancy check element stored in the cyclic redundancy check table.

33. The method of claim 32, wherein the first model comprises a quiet model.

34. The method of claim 32, wherein the second model is selected from the group consisting of a strict model, a normal model, and a free model.

35. The method of claim 32, wherein the cyclic redundancy check table is selected from the group consisting of a strict cyclic redundancy check table, a normal cyclic redundancy check table, and a free cyclic redundancy check table.

36. A system for processing network traffic content, the system comprising:
means for receiving a content stream;
means for creating a first model using raw data of the content stream;
means for searching a first bit table to determine if the first model is represented by a bit set stored in the first bit table;
means for creating a second model using raw data of the content stream;
means for searching a second bit table to determine if the second model is represented by a bit set stored in the second bit table; and
means for searching a cyclic redundancy check table to determine if the second model matches with a cyclic redundancy check element stored in the cyclic redundancy check table, wherein the means for searching a cyclic redundancy check table comprises a processor.

37. A computer product that includes a tangible readable medium usable by a processor having a set of stored instructions, the execution of which causes the processor to execute a process for processing network traffic content, the process comprising:
receiving a content stream;
creating a first model using raw data of the content stream;
storing the first model; and
searching a first bit table to determine if the first model is represented by a bit set stored in the first bit table;
creating a second model using raw data of the content stream;
searching a second bit table to determine if the second model is represented by a bit set stored in the second bit table; and
searching a cyclic redundancy check table to determine if the second model matches with a cyclic redundancy check element, wherein the cyclic redundancy check element is stored in the cyclic redundancy check table in a tangible volatile or non-volatile medium.

* * * * *